United States Patent
Wood

(10) Patent No.: US 10,188,081 B1
(45) Date of Patent: Jan. 29, 2019

(54) PORT AND PERCH INSERT FOR A BIRD FEEDER

(71) Applicants: Graham Evans, Canterbury, Kent (GB); Matthew Wood, Kent (GB)

(72) Inventor: Matthew Wood, Herne Bay (GB)

(*) Notice: Subject to any disclaimer, the term of this patent is extended or adjusted under 35 U.S.C. 154(b) by 0 days.

(21) Appl. No.: 16/110,263

(22) Filed: Aug. 23, 2018

(30) Foreign Application Priority Data

Aug. 25, 2017 (GB) .................... 1713665.6

(51) Int. Cl.
*A01K 39/01* (2006.01)
*A01K 31/12* (2006.01)

(52) U.S. Cl.
CPC .............. *A01K 39/01* (2013.01); *A01K 31/12* (2013.01)

(58) Field of Classification Search
CPC .............. A01K 39/012; A01K 39/0106; A01K 39/0113; A01K 39/01
USPC .............................. 119/57.8, 57.9, 52.2, 52.3
See application file for complete search history.

(56) References Cited

U.S. PATENT DOCUMENTS

| D535,445 S | 1/2007 | Obenshain | |
|---|---|---|---|
| 8,651,054 B2* | 2/2014 | Colvin | A01K 39/012 119/52.2 |
| 9,038,569 B2* | 5/2015 | Hunter | A01K 39/012 119/57.8 |
| 9,038,570 B2* | 5/2015 | Cote | A01K 39/0106 119/57.8 |
| 2009/0223456 A1 | 9/2009 | Hunter et al. | |
| 2011/0067635 A1* | 3/2011 | Puckett | A01K 39/012 119/52.2 |
| 2013/0255582 A1 | 10/2013 | Donegan et al. | |
| 2014/0090600 A1 | 4/2014 | Hoysak | |
| 2017/0231202 A1 | 8/2017 | Cote | |

FOREIGN PATENT DOCUMENTS

| CN | 201796971 U | 4/2011 |
|---|---|---|
| EP | 2 880 973 A1 | 6/2015 |
| GB | 2526558 A | 12/2015 |

OTHER PUBLICATIONS

GB Application No. GB1713665.5 Search Report under Section 17, dated Feb. 7, 2018.

* cited by examiner

*Primary Examiner* — Yvonne R Abbott-Lewis
(74) *Attorney, Agent, or Firm* — Fay Sharpe LLP

(57) ABSTRACT

There is provided a port and perch insert for fitting into an aperture through a wall of a container of a birdfeeder. The port and perch insert comprises a port (34), a perch (32), and a snap fit element which flexes to snap over an edge of the aperture and retain the port and perch insert to the container (12). The snap fit element comprises: a protrusion which snaps over the edge of the aperture to engage against an inside surface of the container; a flexible root portion which connects the snap fit element to a main body of the port and perch insert, and a paddle portion (56) which is pushable from outside the container once the port and perch insert has been fitted to the container, to allow the port and perch insert to be removed from the container.

20 Claims, 5 Drawing Sheets

PORT AND PERCH INSERT FOR A BIRD FEEDER

The present invention relates to a port and perch insert for fitting into an aperture through a wall of a container of a birdfeeder.

BACKGROUND OF THE INVENTION

Most commercially available bird feeders comprise a container for filling with bird feed, and apertures through the walls of the container. A port/perch insert is inserted into the aperture to provide a port for a bird to feed through, and a perch for the bird to stand on.

Many port/perch inserts are retained in position in their apertures by interaction within the container with port/perch inserts on the other side of the container, or with internal fittings linking the port members to one another. However, it is advantageous if port members are made to be independently insertable into and removable from their respective apertures without disturbing other port members.

US 2013/0255582 for example discloses a bird feeder in which each port member has flanges at its upper and lower ends to enable the port member to be retained in a wall aperture of a container. Such an arrangement still requires access to the inside of the container to disengage the flanges, and carries the risk of breakage of either of the small flanges themselves or of the edges of the apertures in the feeder wall.

GB 2526558 of the Applicant solves these problems by providing a bird feeder with two-part port and perch inserts, as reproduced in FIG. 1 of the present disclosure. The bird feeder 10 comprises a container formed by a cylindrical tubular wall 12, suitably of rigid transparent plastics material, fitted to a base 16 at its lower end and covered with a cap 14 at its upper end. Port/perch inserts are fitted into apertures in the wall 12 of the container, at different heights and on different sides to one another. Each of these inserts includes a feeder port 15 and a U-shaped perch 19, for birds to feed off food held inside the container. However, it would be desirable to provide a simpler port and perch insert.

It is therefore an aim of the invention to provide an improved bird feeder.

SUMMARY OF THE INVENTION

According to a first aspect of the invention, there is provided a port and perch insert for fitting into an aperture through a wall of a container of a birdfeeder, the port and perch insert comprising a port, a perch, and a snap fit element which flexes to snap over an edge of the aperture and retain the port and perch insert to the container. The snap fit element comprises: a protrusion which snaps over the edge of the aperture to engage against an inside surface of the container; a flexible root portion which connects the snap fit element to a main body of the port and perch insert, and which flexes to allow the protrusion to snap over the edge of the aperture; and a paddle portion which is pushable from outside the container once the port and perch insert has been fitted to the container, to flex the root portion and move the protrusion out of engagement with the inside surface of the container to allow the port and perch insert to be removed from the container.

Since the snap fit element comprises a paddle portion which is pushable from outside the container to remove the port and perch insert from the container, the port and perch insert is very easy to remove from the container when desired. Preferably, the paddle portion extends outwardly from the container by at least 5 mm, or more preferably at least 10 mm, so it can be easily accessed and pushed.

The main body of the port and perch insert may be a plate-shaped member that engages an outside surface of the container, and which has the port extending through it and the perch attached to it. The paddle portion extends beyond the plate-shaped member in a direction away from the container when the port and perch insert is fitted to the container. The plate-shaped member may have a cut-away portion mid-way along its lowermost edge, the paddle portion extending through the cut-away portion.

The snap fit element and the main body may be integrally formed with one another as one piece to simply the manufacture and the attachment/removal of the port and perch insert to the container. The plate-shaped member, the port, and the perch may also be integrally formed as one piece together with the snap fit element.

The paddle portion may overlap or extend into the perch of the port and perch insert so that it is easily pushed and the port and perch insert removed from the container by grasping the perch. Preferably, the protrusion is between the root portion and the paddle portion. Then, the paddle portion acts like a lever which lowers the force required to displace the paddle portion in comparison to the force required to displace the protrusion directly. Alternatively, the root portion may be between the paddle portion and the protrusion, so the root portion acts like a pivot and pressing the paddle portion in one direction moves the protrusion in an opposite direction.

Once the port and perch insert has been fitted to the container, the root portion may extend inwardly into an interior of the container, and the paddle portion may extend from the root portion and out of the container, so the root portion and paddle portion form a U-shaped strip which is easily flexed to disengage the protrusion from the inside surface of the container.

The port and perch insert is preferably made of metal or of a plastics material, and in the latter case may be injection moulded.

There is also provided a container for bird food having a plurality of apertures and the port and perch inserts described above fitted in the plurality of apertures. Each port and perch insert may fit into first and second ones of said apertures simultaneously, wherein the port fits into the first aperture, and the snap-fit element fits into the second aperture. Then, less of the container wall needs to be cut away to accommodate each port and perch insert.

DETAILED DESCRIPTION

Embodiments of the invention will now be described by way of non-limiting example only and with reference to the accompanying drawings, in which.

Figure 2:
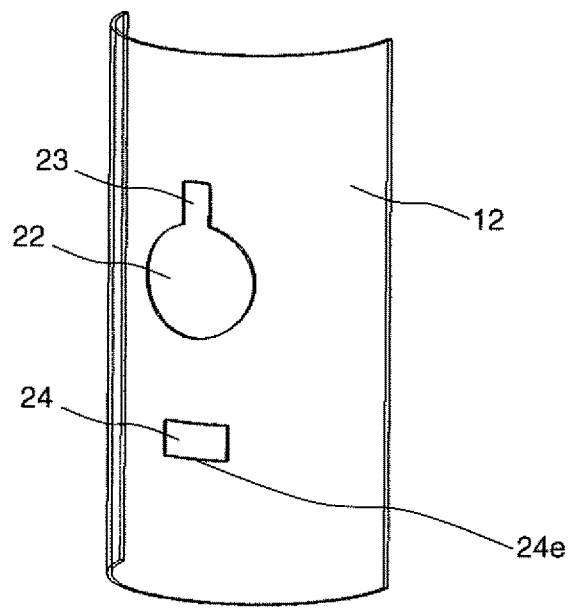
FIG. 2 shows a schematic perspective diagram of a portion of the transparent container of FIG. 1.
Figure 5:
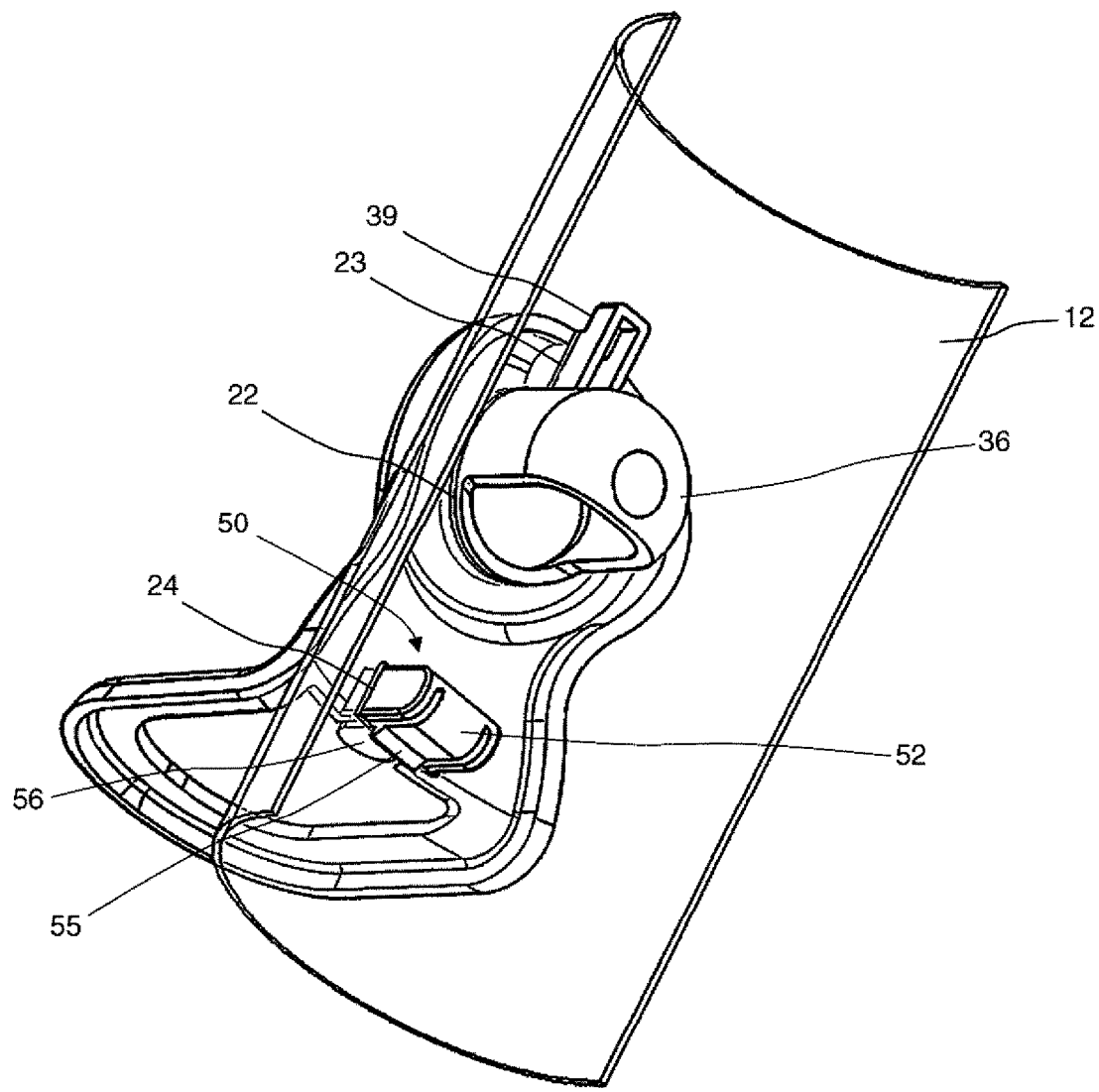
Figure 6:
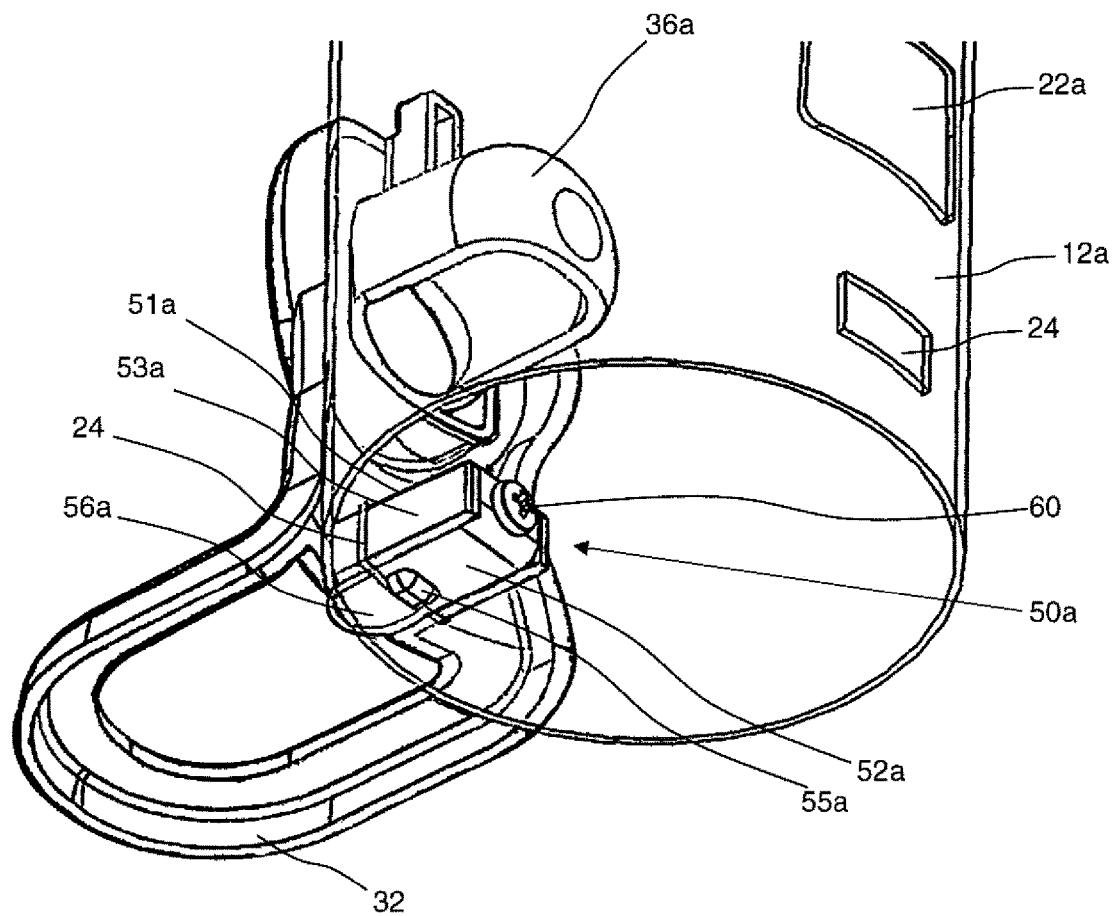

FIG. 5 shows another schematic perspective diagram of the port and perch insert of the first embodiment when fitted into the portion of the transparent container shown in FIG. 2, and when viewed from the inside of the container; and FIG. 6 shows a schematic perspective diagram of a port and perch insert according to a second embodiment of the invention when fitted into a portion of a transparent container, and when viewed from the inside of the container.

The figures are not to scale, and same or similar reference signs denote same or similar features.

Figure 1:
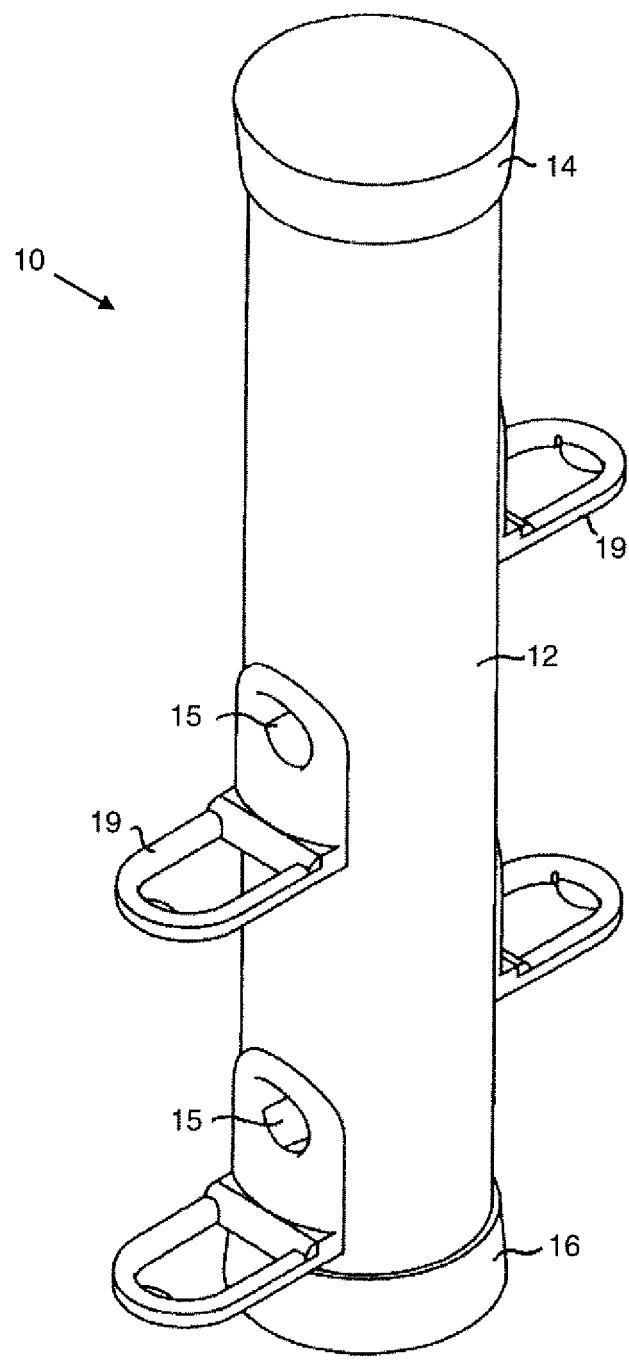
FIG. 1 shows a bird feeder including a transparent container and port/perch inserts as known in the prior art.

The schematic perspective diagram of FIG. 2 shows, for simplicity, only a section of the cylindrical wall 12 of the FIG. 1 birdfeeder. The cylindrical wall 12 of the container has a first aperture in the form of a circular aperture 22 with a small rectangular cutout 23 in its upper edge, and a second aperture in the form of an elongate engagement slot 24 that is positioned below the aperture 22. The first and second apertures allow the port and perch insert of the invention to be fitted to the wall 12 of the container. However, in alternative embodiments the first and second apertures may have alternative shapes, or may be extended into one another so there is only a single aperture.

A first embodiment of the port and perch insert of the invention will now be described with reference to FIG. 3 and FIG. 4. These show schematic perspective diagrams of the port and perch insert of the first embodiment when fitted into the apertures of the cylindrical wall 12 of FIG. 2. Since the wall 12 is transparent, various parts of the port and perch insert both inside and outside of the container 12 can be seen in each of FIG. 3 and FIG. 4.

Figure 3:
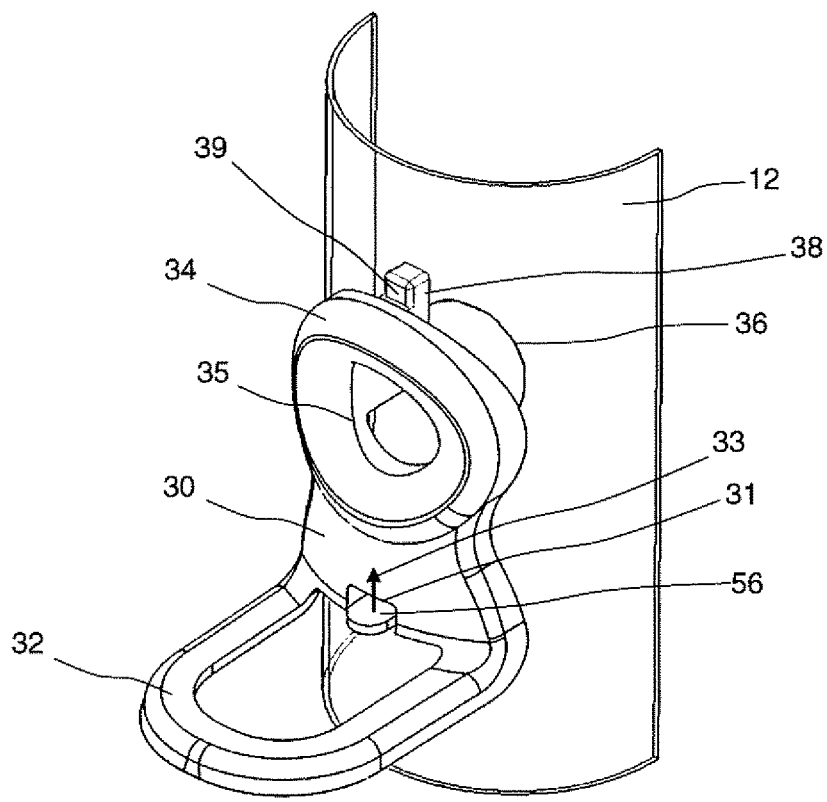
FIG. 3 shows a schematic perspective diagram of a port and perch insert according to a first embodiment of the invention when fitted into the portion of the transparent container shown in FIG. 2, and when viewed from the outside of the container.

First referring to FIG. 3, which shows a view taken from outside of the container, the port and perch insert comprises a main body in the form of a plate-shaped member 30. A port 34 is formed through the plate-shaped member. The port has a hole 35, through which bird can access the interior of the container, and a hood 36 which passes through the aperture 22 of the container wall 12 and into the container to hold food back from directly above the port. The rear side of the plate-shaped member 30 has a curved seating 40 (see FIG. 4), which is shaped to engage the outside surface of the container wall 12 when the port and perch insert is in position.

A U-shaped perch 32 is on a front side of the plate-shaped member 30 opposite from the container wall 12, and extends from the lowermost edge of the plate-shaped member 30, in a direction generally perpendicular to the plate-shaped member 30. A retention member 38 extends vertically upwards from the uppermost edge of the plate-shaped member 30, and has a surface 39 which faces and engages with an inside surface of the container wall 12, just above the aperture 23 in the wall 12 (see FIG. 5).

The plate-shaped member 30 has a rectangular cut-away portion 31, mid-way along the lowermost edge of the plate-shaped member 30, between the two legs of the U-shape. A paddle portion 56 is shown emerging through the cut-away 31, and the cut-away 31 allows the paddle portion 56 to be pushed upwardly in the direction shown by the arrow 33. The uppermost edge of the cut-away portion 31 prevents the paddle portion 56 from being over-extended when it is pushed upwardly in the direction of arrow 33, i.e. the paddle portion 56 abuts the top of the cutaway when the paddle portion is pushed upwardly by its maximum allowable distance.

Figure 4:
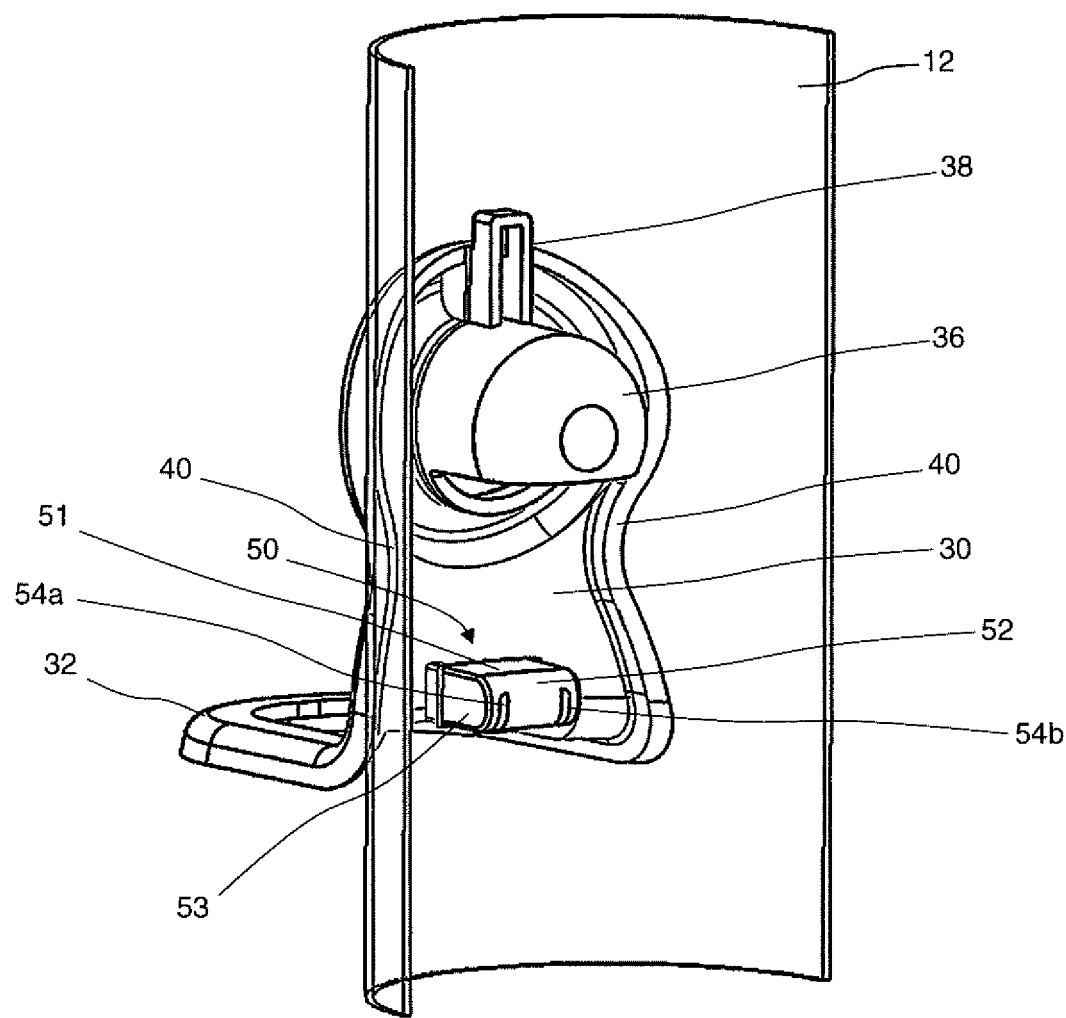
FIG. 4 shows a schematic perspective diagram of the port and perch insert of the first embodiment when fitted into the portion of the transparent container shown in FIG. 2, and when viewed from the inside of the container.

Now referring to FIG. 4, it can be seen that a snap-fit element 50 extends rearwardly from a rear side of the plate-shaped member 30, generally perpendicular to the plate-shaped member. The snap-fit element 50 extends through the aperture 24 of the container wall 12 (see FIG. 5). The snap-fit element 50 has a root portion which connects it to the plate-shaped member 30, and the root portion is formed of a first portion 51 which is directly connected to the plate-shaped member 30. The first portion 51 is a flat plate which extends through the aperture 24, perpendicular to the plate-shaped member 30 and the container wall 12. The root portion is also formed of a second portion 52 which is directly connected to the first portion 51, and which is a strip that curves downwardly and back in upon itself to be in a generally parallel plane to the first portion 51, also see FIG. 5.

The snap fit element 50 also comprises side portions 53 which are flat plates set perpendicular to the first portion 51 of the root portion. The side portions 53 are connected to the root portion, and help support the root portion. The root portion has two parallel slots 54a and 54b to allow the second portion 52 to flex relative to the side portions 53.

Now referring to FIG. 5, it can be seen that the second portion 52 of the root portion is directly connected to the paddle portion 56, at an opposite end of the root portion from the plate-shaped member 30. The snap fit element 50 has a protrusion 55 which is a ridge with a generally triangular cross-section that extends across the width of the strip forming the second portion 52 and the paddle portion 56. The protrusion 55 is formed beneath the interface between the second portion 52 and the paddle portion 56, between the second portion 52 and the paddle portion 56. In this embodiment, the snap fit element 50, plate-shaped member 30, the perch 32, and the port 34 are all integrally formed with one another as one piece, by injection moulding.

The triangular cross-section of the protrusion 55 provides an inclined surface that cams the protrusion 55 upwardly and flexes the second portion 52 of the root portion as the snap fit element 50 is pushed into the aperture 24 during fitting the port and perch insert to the container. Then, the protrusion 55 snaps over the lowermost edge 24e (see FIG. 2) of the container wall, and engages against an inside surface of the container wall 12 to retain the port and perch insert to the container.

When it is desired to remove the port and perch insert from the container, for example for cleaning, the paddle portion 56 can easily be pushed upwardly into the cut-away portion 31, in the direction shown by arrow 33 (see FIG. 3), to flex the second portion 52 of the root portion and lift the protrusion 55 over the edge 24e of the aperture, so that the snap fit element 50 can be withdrawn from the aperture 24 of the container wall 12. The paddle portion 56 extends around 10 mm away from the container wall 12 to provide sufficient leverage on the protrusion 55 and to allow it to be easily pressed from outside of the container, at the front side of the plate-shaped member.

A second embodiment of the invention will now be described with reference to FIG. 6, which shows another port and perch insert fitted to another container wall 12a of a bird feeder. The container wall 12a has the same aperture 24 for the snap fit element as the container wall 12, however the container wall 12a has rectangular apertures 22a for the ports of the perches, instead of the circular apertures 22. Accordingly, the hood 36a has a rectangular shape to fit into the rectangular aperture 22. The port and perch insert of the second embodiment is the same as the port and perch insert of the first embodiment in all other respects, except for that the snap-fit element 50a of the second embodiment differs from the first embodiment.

The snap fit element 50a of the second embodiment has side portions 53a similar to the side portions 53, but has a root portion formed of first and second portions which are separate components to one another. The first portion 51*a* is a plate which extends perpendicular from the plate-shaped member of the port and perch insert, between the sides 53*a* of the snap fit element 50*a*, and which also extends downwardly between the sides 53*a* parallel to the plate-shaped member, where it is connected to the second portion 52*a* of the root portion by a screw 60. The second portion 52*a* extends from the screw 60, between the sides 53*a*, to the container wall 12*a*. The first portion 51*a* is integrally formed with the plate-shaped member, and the second portion 52*a* is formed as a thin plate of spring steel. This thin plate of spring steel also provides a paddle portion 56*a* which extends outwardly from the container wall 12*a* where it can be easily accessed from outside the container.

A protrusion 55*a* is formed as a bump on the lower surface of the thin plate of spring steel, at the interface between the second portion 52*a* and the paddle portion 56*a*. The protrusion 55*a* engages against an inside surface of the container 12*a* when the port and perch insert is fitted to the container 12*a*.

As with the first embodiment, the paddle portion 56*a* can be pushed upwardly from the front of the port and perch insert to disengage the protrusion 55*a* from the edge 24*e* of the aperture 24, and allow the snap fit element 50*a* to be removed from the container wall 12*a*.

The use of a thin plate of spring steel for the second portion 52*a* and paddle portion 56*b* provides the required flexibility for the protrusion 55*a* to snap over the edge 24*e* of the aperture when the port and perch insert is fitted to the container 12*a*, and allows the other parts of the port and perch insert to be integrally formed from a different material, such as plastics, or a different type of metal.

There can thus be provided a bird feeder with port/perch combinations that can easily be inserted and removed individually and independently of one another. Defective ports or perches can be individually replaced, possibly with ports and perches of different sizes and shapes, provided the parts engaging the container are the same. Cleaning of the feeder and of the various inserts is also facilitated. Many other variations of the described embodiments falling within the scope of the invention will be apparent to those skilled in the art.

The invention claimed is:

1. A port and perch insert for fitting into an aperture through a wall of a container of a birdfeeder, the port and perch insert comprising a port, a perch, and a snap fit element which flexes to snap over an edge of the aperture and retain the port and perch insert to the container, wherein the snap fit element comprises:
   a protrusion which snaps over the edge of the aperture to engage against an inside surface of the container;
   a flexible root portion which connects the snap fit element to a main body of the port and perch insert, and which flexes to allow the protrusion to snap over the edge of the aperture; and
   a paddle portion which is pushable from outside the container once the port and perch insert has been fitted to the container, to flex the root portion and move the protrusion out of engagement with the inside surface of the container to allow the port and perch insert to be removed from the container.

2. The port and perch insert of claim 1, wherein the main body comprises a seating which seats against an outside of the container once the port and perch insert has been fitted to the container, and wherein the paddle portion extends beyond the seating in a direction away from the container.

3. The port and perch insert of claim 1, wherein the main body is a plate-shaped member that engages an outside surface of the container.

4. The port and perch insert of claim 3, wherein the paddle portion extends beyond the plate-shaped member in a direction away from the container once the port and perch insert has been fitted to the container.

5. The port and perch insert of claim 3, wherein the port is formed through the plate-shaped member.

6. The port and perch insert of claim 3, wherein the perch is directly connected to the plate-shaped member.

7. The port and perch insert of claim 1, wherein the snap fit element and the main body are integrally formed with one another as one piece.

8. The port and perch insert of claim 3, wherein the plate-shaped member, the port, and the perch are integrally formed with one another as one piece.

9. The port and perch insert of claim 1, wherein the snap fit element and the main body are integrally formed with one another as one piece.

10. The port and perch insert of claim 1, wherein the paddle portion extends in a direction that is away from both the root portion and the container once the port and perch insert has been fitted to the container.

11. The port and perch insert of claim 1, wherein the paddle portion overlaps or extends into the perch of the port and perch insert.

12. The port and perch insert of claim 1, wherein the protrusion is between the root portion and the paddle portion.

13. The port and perch insert of claim 1, wherein the root portion comprises a first portion that is directly connected to the main body and which extends inwardly into an interior of the container once the port and perch insert has been fitted to the container and a second portion which is directly connected to the paddle portion, wherein the second portion is between the first portion and the paddle portion.

14. The port and perch insert of claim 13, wherein the protrusion is between the second portion and the paddle portion.

15. The port and perch insert of claim 1, wherein the protrusion is biased by the root portion towards its position engaging the inside surface of the container once the port and perch insert has been fitted to the container.

16. The port and perch insert of claim 1, wherein the perch comprises a U-shaped member and the paddle extends into the U-shape.

17. The port and perch insert of claim 1, wherein the protrusion comprises a ramped incline which engages with the edge of the aperture to flex the root portion as the port and perch insert is inserted into the aperture.

18. The port and perch insert of claim 1, wherein once the port and perch insert has been fitted to the container, the paddle extends outwardly from the container by at least 5 mm.

19. A bird feeder comprising a container for bird food having a plurality of apertures and port and perch inserts according to claim 1 fitted in said apertures.

20. The bird feeder of claim 19, wherein each port and perch insert fits into first and second ones of said apertures simultaneously, wherein the port fits into the first aperture, and the snap-fit element fits into the second aperture.

* * * * *